United States Patent
Ryan et al.

[11] Patent Number: 6,104,397
[45] Date of Patent: Aug. 15, 2000

[54] METHOD AND SYSTEM FOR GENERATING IMPROVED PROGRESS INDICATORS

[75] Inventors: Chris J. Ryan, Mountain View; Donald R. Gentner, Palo Alto, both of Calif.

[73] Assignee: Sun Microsystems, Inc., Mountain View, Calif.

[21] Appl. No.: 08/884,962

[22] Filed: Jun. 30, 1997

[51] Int. Cl.⁷ .................................................. G06F 3/00
[52] U.S. Cl. .......................... 345/348; 345/349; 345/977
[58] Field of Search .................................. 345/145, 326, 345/334, 340, 348, 349, 967, 977

[56] References Cited

U.S. PATENT DOCUMENTS

| | | | |
|---|---|---|---|
| 4,974,173 | 11/1990 | Stefik et al. | 345/331 |
| 5,301,348 | 4/1994 | Jaaskelainen | 395/183.22 |
| 5,392,207 | 2/1995 | Wilson et al. | 345/349 X |
| 5,452,416 | 9/1995 | Hilton et al. | 345/346 |
| 5,519,828 | 5/1996 | Rayner | 345/326 |
| 5,630,081 | 5/1997 | Rybicki et al. | 345/349 |
| 5,745,713 | 4/1998 | Ferguson et al. | 345/339 |

*Primary Examiner*—Raymond J. Bayerl
*Assistant Examiner*—X. L. Bautista
*Attorney, Agent, or Firm*—Joseph Yang; Skadden, Arps, et al.

[57] ABSTRACT

A method and system for generating improved command progress indicator including the steps of establishing at a location of a display at least one computer-generated graphic indicator associated with at least one computer executable operation in a first-state appearance, the graphic indicator having a first-state appearance and a dynamic second-state appearance, signaling the computer to conduct an operation, altering the appearance of the computer-generated graphic indicator from the first-state appearance to the dynamic second-state appearance while the computer is conducting the operation, and restoring the appearance of the computer-generated graphic indicator from the dynamic second-state appearance to the first-state appearance when the computer has completed the operation. An embodiment of the invention uses a button graphic as the computer-generated graphic indicator and further comprises the steps of establishing a cursor on the video display, positioning the cursor on the button graphic using a cursor control device, selecting the button graphic for signaling said computer to conduct the associated operation. When the button graphic is clicked and the computer begins executing the associated operation, the appearance of the button graphic will become a dynamic second-state appearance comprising the repeated steps of adding and subsequently removing a highlight color from the first-state appearance of the button graphic at predetermined intervals. Alternatively, the appearance of the button graphic could become an animated graphic superimposed upon a background comprising a version of the original icon graphic.

7 Claims, 8 Drawing Sheets

40          41

METHOD AND SYSTEM FOR GENERATING IMPROVED PROGRESS INDICATORS

FIELD OF INVENTION

The invention relates to computer graphic user interfaces and, more particularly, to a system and method for generating improved command progress indicators.

BACKGROUND

As the use of computers has become more and more prevalent, much attention has turned to increasing the efficiency of computer systems by improving the ease with which users may operate the computer. It is widely known that the ability of a user to receive and understand information in order to interact efficiently with the computer is critical to the effectiveness of the computer system. Currently, such interaction is most often achieved through the use of graphic user interfaces ("GUI"): the use of graphic displays in conjunction with a device manipulable by the user for specifying a location on the display (e.g., a mouse or keyboard) and means for "clicking on" that location in order to select an object (e.g., an icon or button graphic) visually associated with that location. Such GUIs typically use windows, tool-bars, pull-down menus, pop-up screens, etc. to increase the ease of using the computer. Two well-known graphic user interfaces include the Apple Macintosh Operating System and Microsoft Windows.

A necessary component of graphic user interfaces is the ability of the computer to generate feedback to the user regarding the operating status of the computer. Two important types of feedback a user generally must have is knowledge whether the computer is executing a particular task at any given time and whether and what commands are available to be used while the computer is executing those tasks.

Typically, the computer informs the user that an operation is in progress by altering the appearance of the cursor associated with the pointing device into a special static or dynamic graphic (such as a watch or a "spinning beach ball"). One problem with this approach is that it may connote to the user that no other actions are possible until the operation is completed. The cursor is the primary interface element for the user. The user will likely interpret the disappearance or alteration of the appearance of the cursor to mean that no other interactions or operations are possible. Thus, a user may waste time waiting for the operation to finish and the cursor to change back before proceeding with another action. Using a generic cursor change as a progress indicator also gives the user little information regarding which command is being executed.

Another approach has been to use a special dialog window to indicate the progress of an operation. The dialog box may contain some animated graphic, such as a "thermometer," that "fills up" as the operation progresses. As with the other types of progress indicators, the use of the dialog window connotes to the user that no other actions may be conducted while the operation is in progress. For example, dialog windows may block portions of the display containing otherwise selectable command icons, thereby giving the user the impression that those functions may not be accessed while the dialog window is in place. Finally, dialog boxes tend to clutter up the screen.

The weaknesses of these prior art progress indicators can be explained, in part, by the fact that they were originally designed for and implemented in single-tasking computer environments. In early single-tasking computers (such as the first Apple Macintoshes), no other commands could be used while an operation was still in progress. Thus, it did not matter than cursor changes and dialog windows connoted to the user that no other computer functions could be utilized. These same types of progress indicators, however, continued to be used when computers became multi-tasking (i.e., the computer was capable of running more than one application at a time) and multi-threaded (i.e., the computer was capable of executing multiple operations within a single application context). In this context, the progress indicators tend falsely to lead the user to believe that only one operation may be conducted at a time.

Some GUIs utilize sustained highlighting of graphic icons while their commands are in progress. This approach also connotes to the user that no other functions may be activated until the operation has completed.

Another method of communicating the operating status of the computer to the user in a multi-threaded computer environment is to change the cursor (e.g., into a watch or hourglass) only when it passes over a predesignated area on the video display representing a command in progress. Typically the predesignated area representing a command in progress is the same button graphic which the user must click to execute the command. The disadvantage of this type of indicator is that the user will not know which, if any, commands are in progress until he or she passes the cursor over each of the button graphics on the screen. Thus, the user must waste time positioning the cursor from one button to the next in order to determine which commands are being executed at any given time.

The Network Computer ("NC") environment poses additional challenges with respect to providing user feedback for command execution delays and lengthy operations. An NC differs from a traditional personal computer in that the NC has no permanent local storage. Instead, the NC obtains its software (e.g., operating system and applications) and data as needed over a network from a central server. Accordingly, some commands may take longer to execute on an NC than on a typical personal computer because software and data must be loaded across the network from a server. The length of the delay for any particular command operation is highly unpredictable because it depends on the speed of the network, the network traffic and the processing resources available at the time.

This type of delay in the NC environment may even affect the use of PC-style progress dialogs themselves in that it may take a significant amount of time simply to load the classes necessary to generate a dialog window on the visual display, in order to inform the user that an operation is in progress. Additionally, a "thermometer" type window is particularly inappropriate to indicate operations processed on the central server because the local computer does not have sufficient access to the processing information on the server.

Finally, the increased delays in the multi-tasking, multi-threaded NC environment only amplifies the shortcomings of using a cursor change as a progress indicator. Because a cursor change may lull the user erroneously into thinking no other functions may be used while the cursor is altered, any added delay in processing means more time potentially wasted by the user waiting for the cursor to return to its previous form. Similarly, because a cursor change does not give the user information regarding which commands are in progress, any increase in the delay will increase the likelihood that the user will become confused as to which commands he has or has not executed.

Accordingly, there is a need for improved progress indicators in a GUI.

SUMMARY OF THE INVENTION

A method and system for generating improved command progress indicator is provided generally including the steps of establishing at a location of a display at least one computer-generated graphic indicator associated with at least one computer executable operation in a first-state appearance, the graphic indicator having a first-state appearance and a dynamic second-state appearance, signaling the computer to conduct an operation, altering the appearance of the computer-generated graphic indicator from the first-state appearance to the dynamic second-state appearance while the computer is conducting the operation, and restoring the appearance of the computer-generated graphic indicator from the dynamic second-state appearance to the first-state appearance when the computer has completed the operation.

An embodiment of the invention uses a button graphic as the computer-generated graphic indicator and further comprises the steps of establishing a cursor on the video display, positioning the cursor on the button graphic using a cursor control device, clicking on the button graphic for signaling the computer to conduct the associated operation. When the button graphic is clicked and the computer begins executing the associated operation, the appearance of the button graphic will become a dynamic second-state appearance comprising the repeated steps of adding and subsequently removing a highlight color from the first-state appearance of the button graphic at predetermined intervals. Alternatively, the appearance of the button graphic could become an animated graphic superimposed upon a background comprising a lightened version of the original button graphic.

BRIEF DESCRIPTIONS OF THE FIGURES

Same numerals in FIGS. 1–6 are assigned to similar elements in all the figures.

Embodiments of the invention are discussed below with reference to FIGS. 1–6.
However, those skilled in the art will readily appreciate that the detailed description given herein with respect to these figures is for explanatory purposes as the invention extends beyond these limited embodiments.

DETAILED DESCRIPTION OF THE INVENTION

Figure 1:
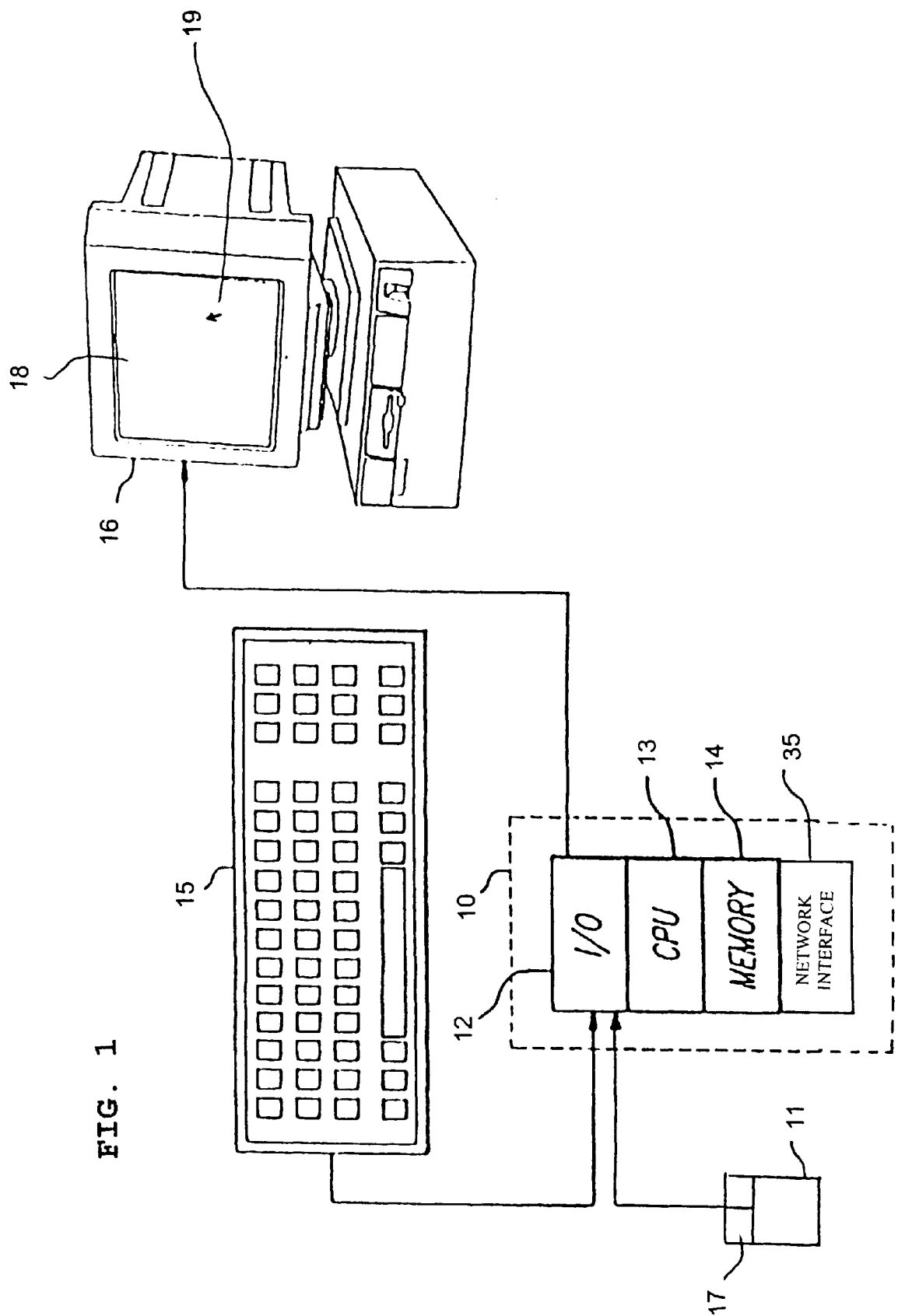
FIG. 1 illustrates an exemplary hardware system in which the invention may be implemented.

The system and method for generating improved status indicators of the invention is implemented on a computer system such as that illustrated in FIG. 1. Shown is a computer 10, which comprises three major components. The first of these is an input/output (I/O) circuit 12 which is used to communicate information in appropriately structured form to and from other portions of the computer 10. In addition, computer 10 includes a central processing unit (CPU) 13 coupled to the I/O circuit 12 and a memory 14. These elements are those typically found in most general purpose computers and, in fact, computer 10 is intended to be representative of a broad category of data processing devices capable of generating graphic displays. A raster display monitor 16 is shown coupled to the I/O circuit 12 and issued to display images generated by CPU 13 in accordance with the invention. Any well known variety of cathode ray tube (CRT) or other type of display may be utilized as display 16. The computer system further includes a cursor control means 11, such as a mouse, track ball, joystick or other device for selectively positioning a cursor 19 on display screen 18 of the display monitor 16. Typically, the cursor control means 11 includes a signal generation means, such as a switch 17 having a first position and a second position. As illustrated in FIG. 1, cursor control means 11 (hereinafter all types of cursor control means known in the art such as mice, track balls, joysticks, keyboard cursor control buttons, graphic tablets, etc., will be collectively referred to as the "mouse 11") is coupled to the I/O circuit 12.

Also, a keyboard 15 to input data and commands into the computer 10 is provided, as is well known in the art. Moreover, it will be appreciated that additional devices may be coupled to the computer 10, such as magnetic tape drives, CD ROM drives, external printers, magnetic memory disks, etc. Additionally, computer 10 may include a network interface component 35 that may be linked to networks, which are in turn coupled to other data processing systems. The computer 10 may further include circuitry incorporating the invention, or more commonly, the invention may be implemented in software executed by computer 10 or by a central processor connected to computer 10 via network interface component 35.

Figure 2:
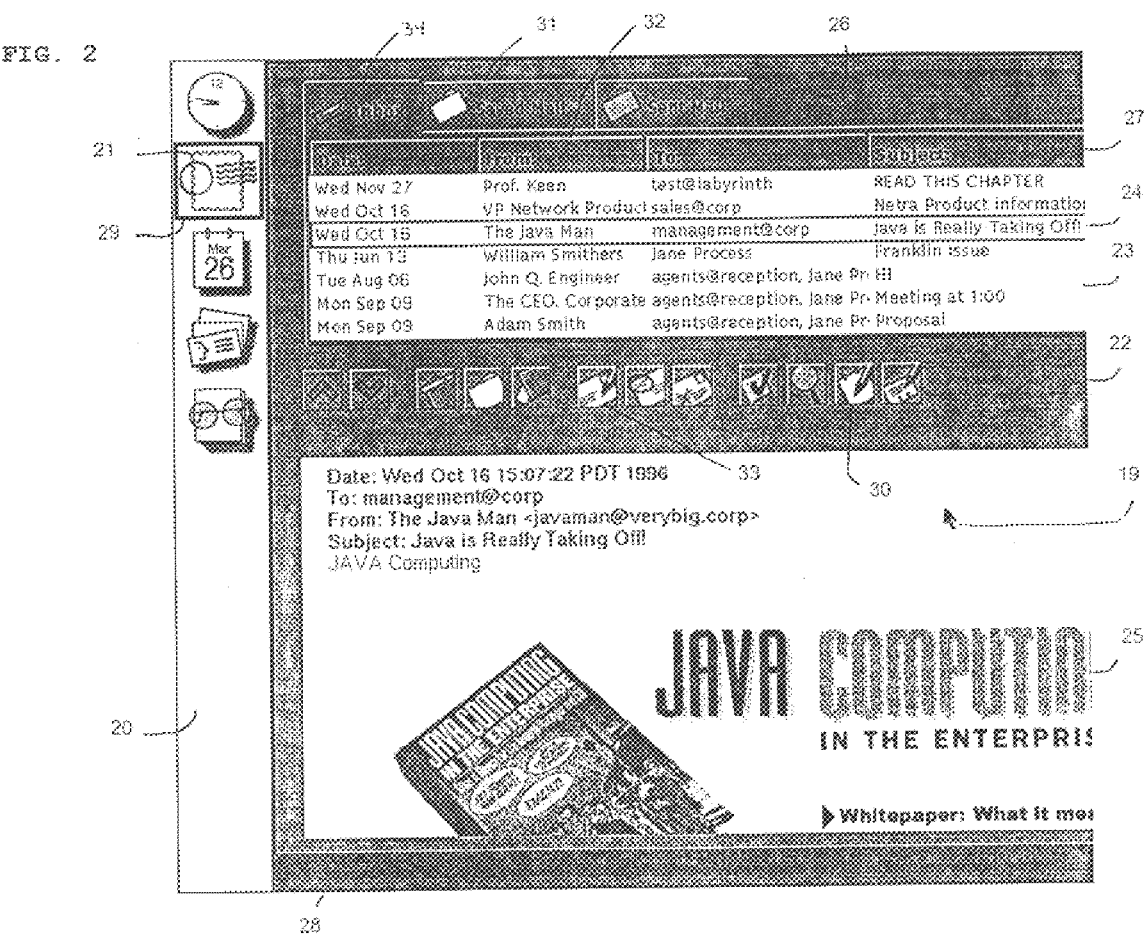
FIG. 2 illustrates an exemplary display arrangement, in which the invention may be implemented.

Referring now to FIG. 2, the display screen 18 of the display 16 is shown in representative detail. This display arrangement 28 is merely exemplary and is provided to enhance the understanding of the intended function of the invention. Based on the description of the invention it will be clear to those skilled in the art that many other types of display types and arrangements are possible.

The specific display arrangement 28 shown in FIG. 2 is from HotJava Views 1.0 designed by the JavaSoft Division of Sun Microsystems. HotJava Views is a webtop user environment for NCs. An NC differs from a traditional personal computer in that the NC has no permanent local storage, but instead obtains its software (e.g., operating system and applications) and data as needed over a network from a central server. The HotJava Views environment utilizes a set of applications. Each application fills the main screen when selected and the user is given the ability to toggle between them.

HotJava Views utilizes an intuitive GUI based on command initiator objects in the form of "buttons" or "button graphics." Although HotJava Views lacks some of the characteristic features of most current GUIs, such as the desktop metaphor, file systems, and the distinction between applications and documents, it will be apparent to those skilled in the art that the invention may be applied to those prior art GUIs as well, whether implemented on an NC or not. Any GUI that uses icons or "buttons" to represent commands executable by the computer may implement the invention.

As can be seen from FIG. 2, a selector 20 is provided which spans the left-most side of display screen 18 vertically. The selector 20 typically contains a plurality of graphic icons, such as the mail application icon 21 represented in the shape of a postage stamp. The outline 29 surrounding mail application icon 21 indicates that the "MailView" application is the "active" application currently being displayed on display screen 18. The user toggles between different applications by clicking on one of the icons in the selector 20 along the left side of the display screen 18. In one embodiment of the invention, the typical applications which may be accessed using the selector 20 are: (1) MailView—an electronic mail application (shown); (2) CalendarView—an electronic calendar; (3) NameView—A directory of people; (4) InfoView—A web browser for viewing intranet documents and (optionally) Internet documents; and (5) a "Welcome" screen which offers, among other things, a logout command to the user.

FIG. 2 further shows a command button bar 22 horizontally spanning the middle of display screen 18 between a mail folder list 23 and a message body field 25. The command button bar 22 typically includes a plurality of command initiator objects represented to a user in the form of "buttons," such as scheduling button 30. Each button represents a command option which may be executed by computer 10. Those with skill in the art will appreciate that such buttons or button graphics may conceivably be located at any location on the display screen 18 and be represented in various different forms known in the art such as switches, toggles, etc.

In the example illustrated in FIG. 2, the mail folder list 23 lists a variety of documents such as message 24, each representing an electronic mail received (or sent) by the user. Immediately located above mail folder list 23 is a mail sorting bar 27 which includes a plurality of command buttons, such as "From" button 32. Each of the command buttons on mail sorting bar 27 has a command associated with it relating to the manner in which electronic messages are organized and displayed in mail folder list 23. Above mail sorting bar 27, horizontally spanning the top of display screen 18, is mail folder selector tab bar 26. Mail folder selector tab bar 26 typically contains three graphic icons, such as "Saved Mail" icon 31. The icons included in mail folder selector tab bar 26 each have a command associated with it controlling the general category of electronic mail messages displayed in mail folder list 23. For example, "Saved Mail" icon 31, when activated, would cause all messages that the user has earmarked to be saved to be displayed in mail folder list 23. In the display arrangement 28 shown in FIG. 2, the "Inbox" icon 34 on mail folder selector tab bar 26 is active, thereby causing electronic mail messages received by the user, but not yet earmarked to be saved, to be displayed in mail folder list 23.

The user may select a message from mail folder list 23 and have its text, graphics, etc., displayed in message body field 25. In the example shown in FIG. 2, message 24, outlined in black, is active and its text and graphics are displayed in message body field 25. Graphic cursor 19, is also shown on display arrangement 28. Focusing now on the command button bar 22 shown in FIG. 2, each of the "buttons" has an executable command associated with it. The executable commands may range from bringing up dialog windows containing information and/or other buttons, printing a document, searching a database, rearranging the information displayed on the screen in a certain way, etc. For example, "Schedule Appointment" button 30, when activated, will schedule any appointment attached to the displayed message in the user's electronic calendar. Similarly, "Print" button 33, when clicked, sends the a print command to the computer 10 to print the message text and graphics displayed in message body field 25 on any external printing device coupled to the computer 10. Those skilled in the art will understand that there are an almost limitless number of types of executable commands possible, primarily depending upon the particular applications running on the computer and the manner information is manipulated by the GUI.

In one embodiment of the invention, the command associated with a button, may be executed by using the mouse 11 to position the cursor 19 on the desired button graphic and clicking the button using the switch 17 on the mouse 11. Commands associated with a button may also be executed in other ways, such as by the CPU 13 in computer 10 as the result of some software or hardware operation or a signal received through a network coupled to the computer 10. Similarly, commands associated with a button may be executed by entering keystroke-equivalent commands using keyboard 15.

When a button from command button bar 22 is clicked and its associated command is executed, the appearance of the button will change from a static button graphic to a dynamic one in order to indicate to the user that the computer is executing the requested command. This progress indicator may retain many aspects of the appearance of the original static button graphic. For example, the progress indicator may constitute an animation which uses the original button graphic (perhaps highlighted or lightened) as a background.

Because the progress of the command operation is indicated by changing the appearance of the actual button associated with that command in a way the retains many visual aspects of the original button graphic, the user will easily be able to distinguish which command a particular progress indicator is monitoring. Moreover, by keeping the progress indicator in or near the command button, there is less chance that the user will erroneously believe he or she must wait for the command operation to complete its execution before utilizing other functions of computer 10. Thus, the invention potentially increases the efficiency of the computer 10 by minimizing the risk that a user will sit idly waiting for the command to finish executing when he or she could be using other computer functions concurrently.

This improves upon prior art progress indicators such as changing the cursor or using a dialog window with a "thermometer" to indicate the progress of a command. Neither of these methods allow a user easily to associate the command operation with the particular progress indicator and both tend to give the user the impression that no other computer functions may be used until the operation has been completed and the cursor has changed back to the previous cursor or the dialog window has disappeared. The ability of the user to link the progress indicator with the specific command it is indicating and to know that he or she may activate other computer functions while the command is executing is especially important in today's multi-application, multi-threaded GUI environments wherein many operations may potentially be running at any given time.

The executable commands associated with buttons will initiate computer operations lasting varying lengths of time. Under one embodiment, commands which result in relatively short operation times use a "flashing" in-button progress indicator. In another embodiment, commands which result in more substantial execution times utilize an animated in-button progress indicator.

Flashing Embodiment

In the multi-tasking, multi-threaded NC environment, many typical commands, such as displaying a dialog window, or viewing the body of a selected main message result in longer delays than they might if executed in a traditional PC environment. Because of network delays and/or the loading of classes necessary for the completion of such operations, these delays may be more significant than what is normally appropriate to indicate with a brief cursor change. As discussed above, a cursor change typically does not provide the user with any information regarding which command is being executed and may erroneously connote to the user that no other computer functions may be utilized. While this may not be a problem if the execution time is very brief, it is likely to cause confusion and inefficiency if a longer delay is necessary. At the same time, it may be inappropriate to use a much more significant indicator of delay—both because the delay may turn out to be very short in the majority of cases, and because too many progress indicators might make the system appear "slow" to the user.

According to one embodiment of the invention implemented in HotJava Views, the fact that this type of command is in progress is communicated to the user by a relatively subtle graphic shift in the associated button. A command button indicates a request in progress by "flashing" or adding a highlight color to its graphic. The timing interval for the "flashing" is 1.5 seconds "on" (i.e., the "glowing" highlighted graphic) and 0.5 seconds "off" (i.e., the normal button graphic). The highlighted graphic could be represented in numerous ways including adding color or shading to the button graphic or lightening the contrast of the graphic. In some embodiments of the invention, once the command is started, the operation may not be stopped in mid-execution. Accordingly, under these embodiments, the button will not accept any mouse clicks while the operation is in progress.

Figure 3:
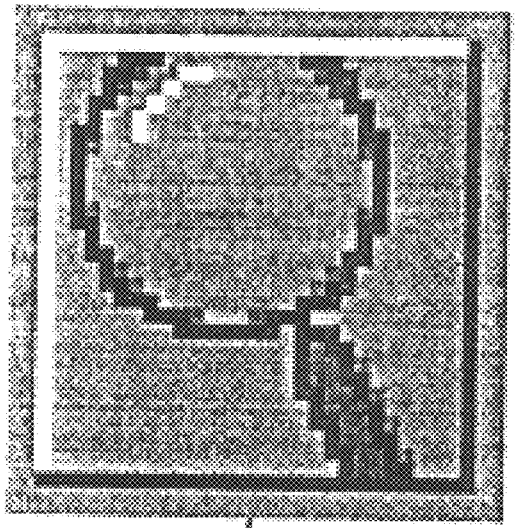
FIG. 3 illustrates the appearance states for an exemplary button graphic in accordance with one embodiment of the invention.
Figure 3:
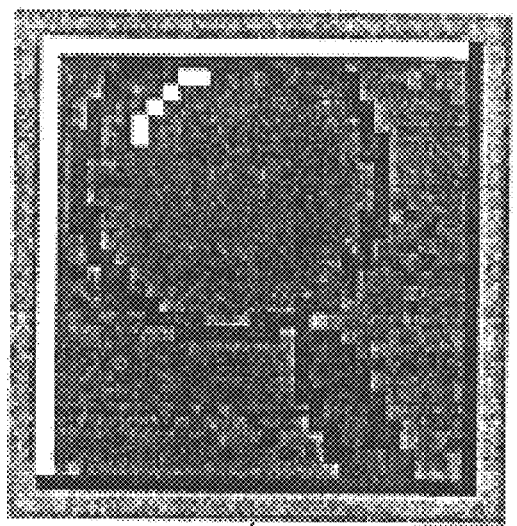

FIG. 3 shows magnified views of the normal ("off") state 40 and the highlighted ("on") state 41 for an exemplary button graphic that "flashes" when its command is executed.

Animated Embodiment

Figure 4:
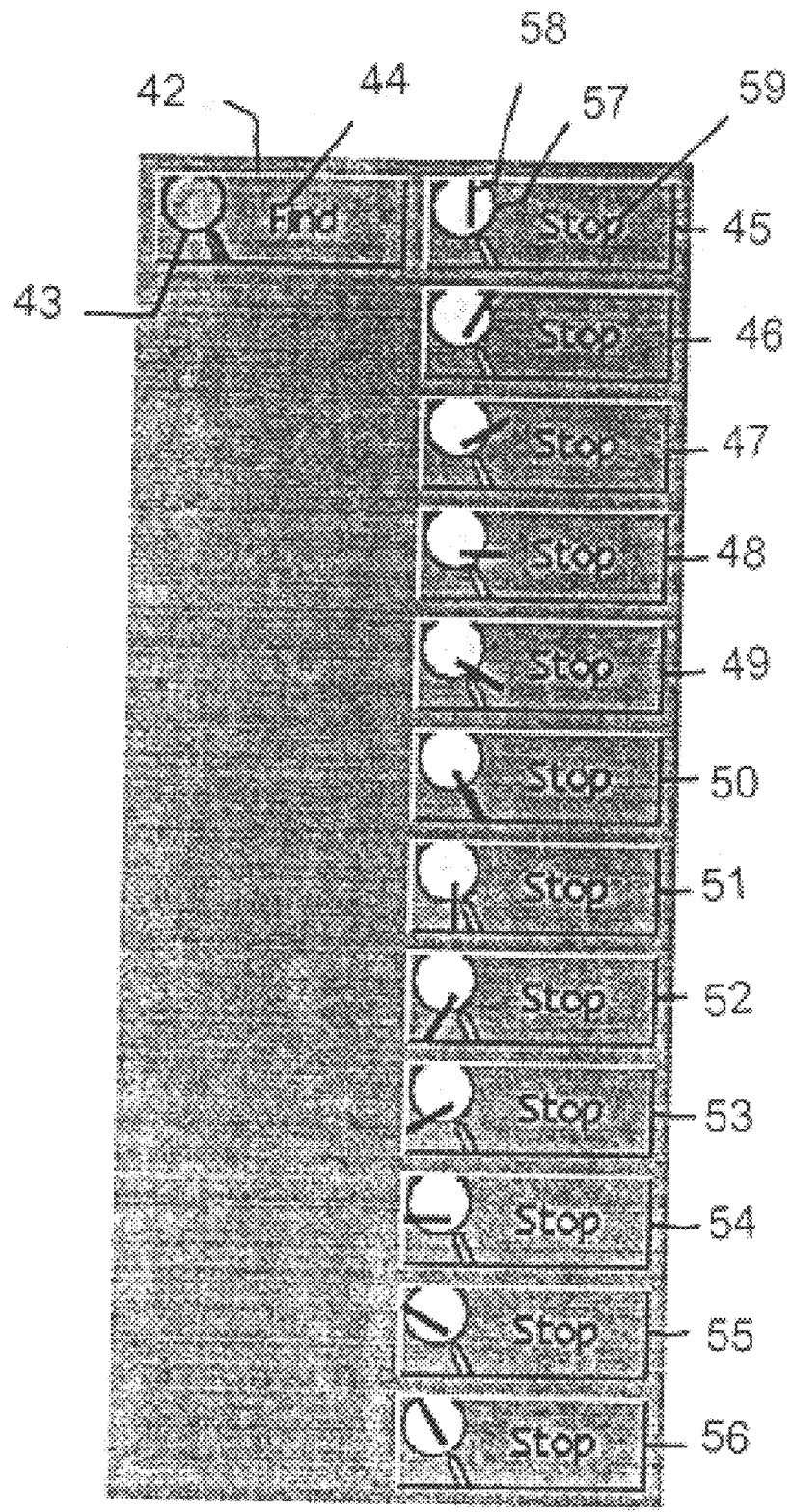
FIG. 4 shows the static and animated appearance states for an exemplary button graphic in accordance with another embodiment of the invention.

In one embodiment, commands which start a process or for which the number of operations or end time is indeterminate, are, when executed, indicated by an animated spinning clock hand within the button that initiates the process. FIG. 4 shows both the static/standard state and animated progress indicator state for an exemplary button associated with a command that results in an indeterminate delay. Note that the static "Find" button graphic 42 includes a graphic 43, and a "Find" button label 44. The "Find" progress indicator is animated and is therefore shown in frames 45–56. Note that the "Find" progress indicator 45–56 has a background graphic 57 that is a lightened version of the original inactive button graphic 43. Superimposed on the lightened background is an animated spinning clock hand 58. Using animation techniques well known in the art, the animated clock hand 58 is made to rotate 360 degrees at a predetermined interval while the button operation is in progress.

One embodiment of the invention also changes button label 44 to a "Stop" button label 59 within the progress indicator 45–56. During command execution, the progress indicator 45–56 continues to exhibit the "Stop" label 59. For an operation using this type of progress indicator 45–56, the user may halt the operation in mid-progress by positioning the cursor 19 on the progress indicator 45–56 and clicking on switch 17 on mouse 11.

EXAMPLES

Figure 5A:
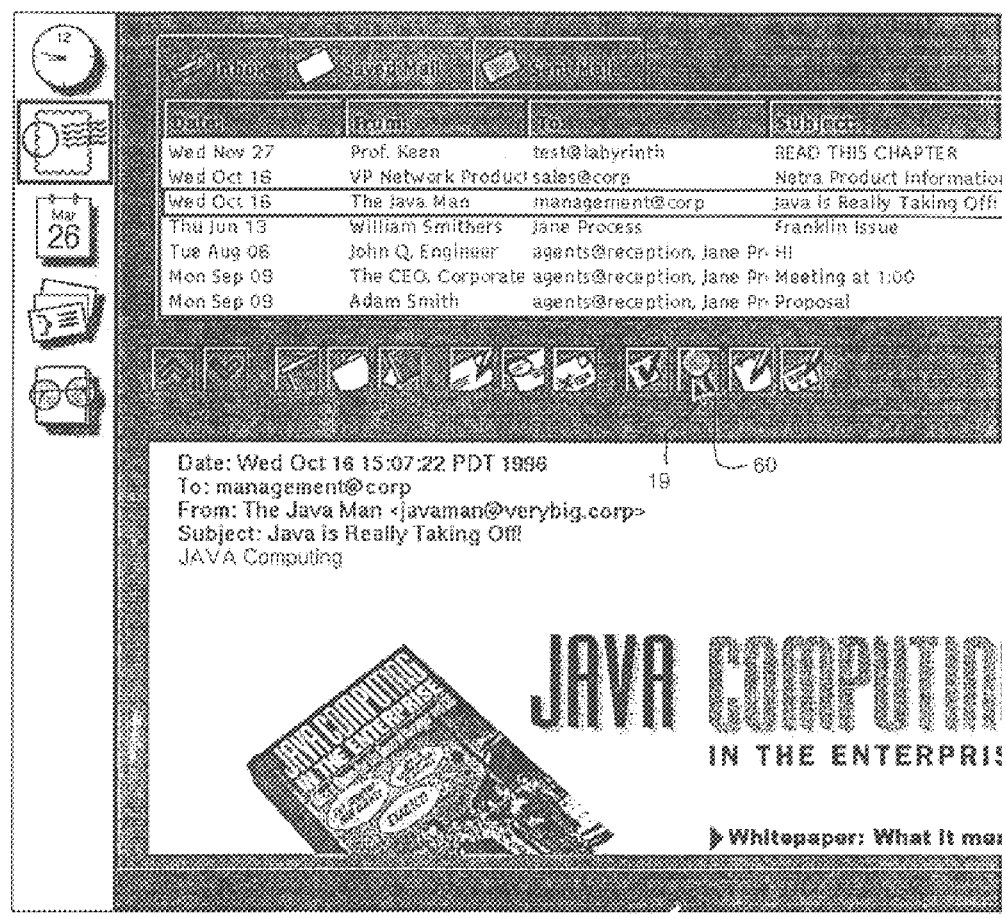
FIGS. 5a and 5b illustrate the operation of one embodiment of the invention.

As discussed above, one embodiment of the invention uses a "flashing" progress indicator for commands resulting in relatively short delays. Common operations resulting in short delays are those that ask for more information. In a menu-based application such as MS-Windows, such commands would typically show an ellipses (" . . . ") after the command name. Referring to FIG. 5a, the off state search button 60 appears as a command in the MailView application. Also shown in FIG. 5a is cursor 19 positioned over off state search button 60. All other aspects of the MailView display screen shown in FIG. 5a correspond with the detailed description regarding the MailView display screen shown in FIG. 2.

Figure 5B:
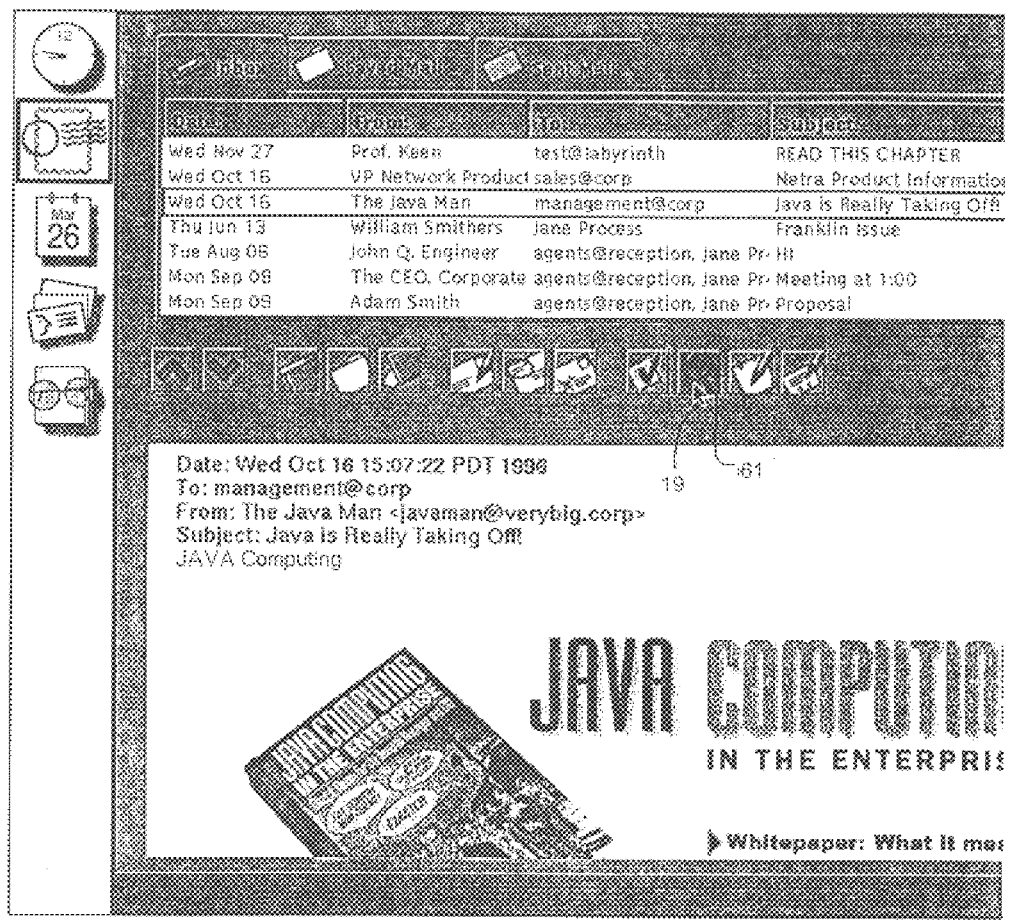
Figure 6A:
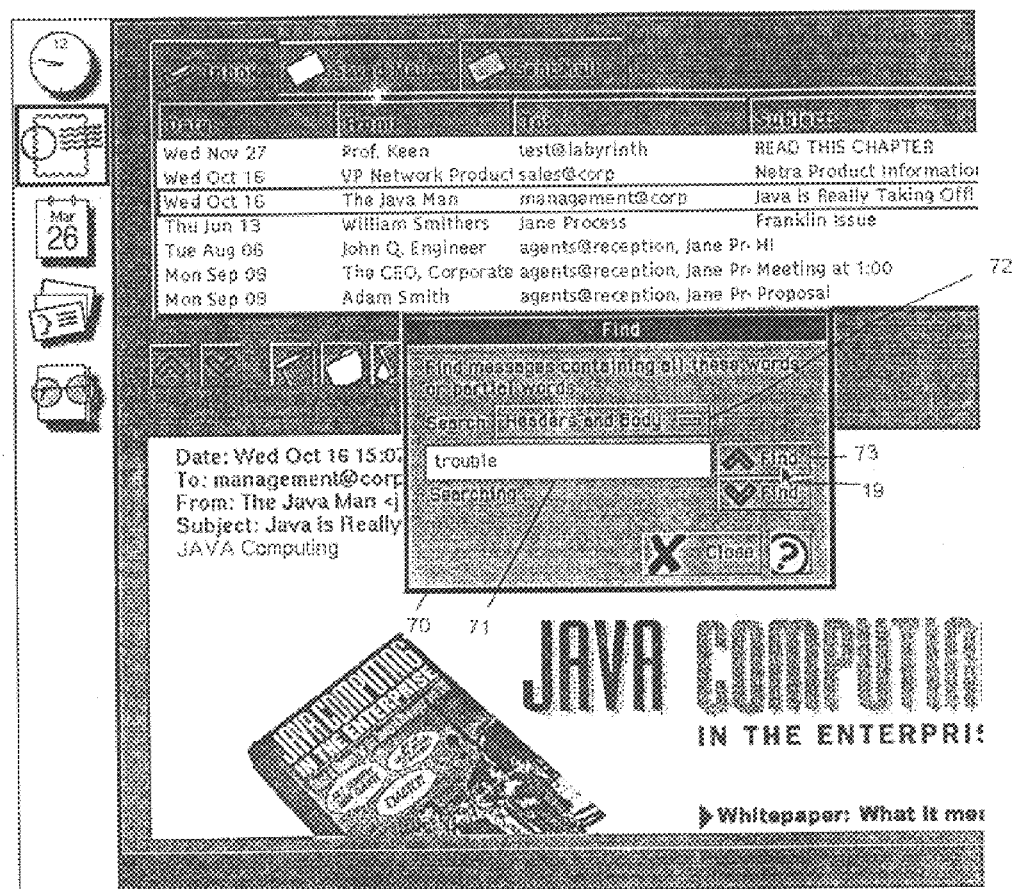
FIGS. 6a and 6b illustrate the operation of another embodiment of the invention.

FIG. 5b shows the screen in FIG. 5a after off state search button 60 is clicked and the computer begins to execute the requested operation: displaying the search dialog window. The search button is shown in FIG. 5b in its on state appearance 61. As the operation is in progress, the search button will appear to the user to be flashing between the off state search button 60 appearance and the on state search button 61 appearance at intervals of 1.5 seconds "on" and 0.5 seconds "off" until the requested search dialog window appears. FIG. 6a shows the same MailView screen as in FIG. 5b after the computer 10 has completed the request to display the search dialog window 70.

Another embodiment of the invention utilizes an animated progress indicator for commands that may result in more significant or indeterminate delays. The common example of an operation with an indeterminate execution time is a search request. Requesting a search starts a process which can potentially run for a significant amount of time. Referring again to FIG. 6a, static "Find" button 73 located in search dialog window 70 is associated with the command to conduct a search based on parameters established in keyword field 71 and message search category button 72. Cursor 19 is positioned over static "Find" button 73.

Figure 6B:
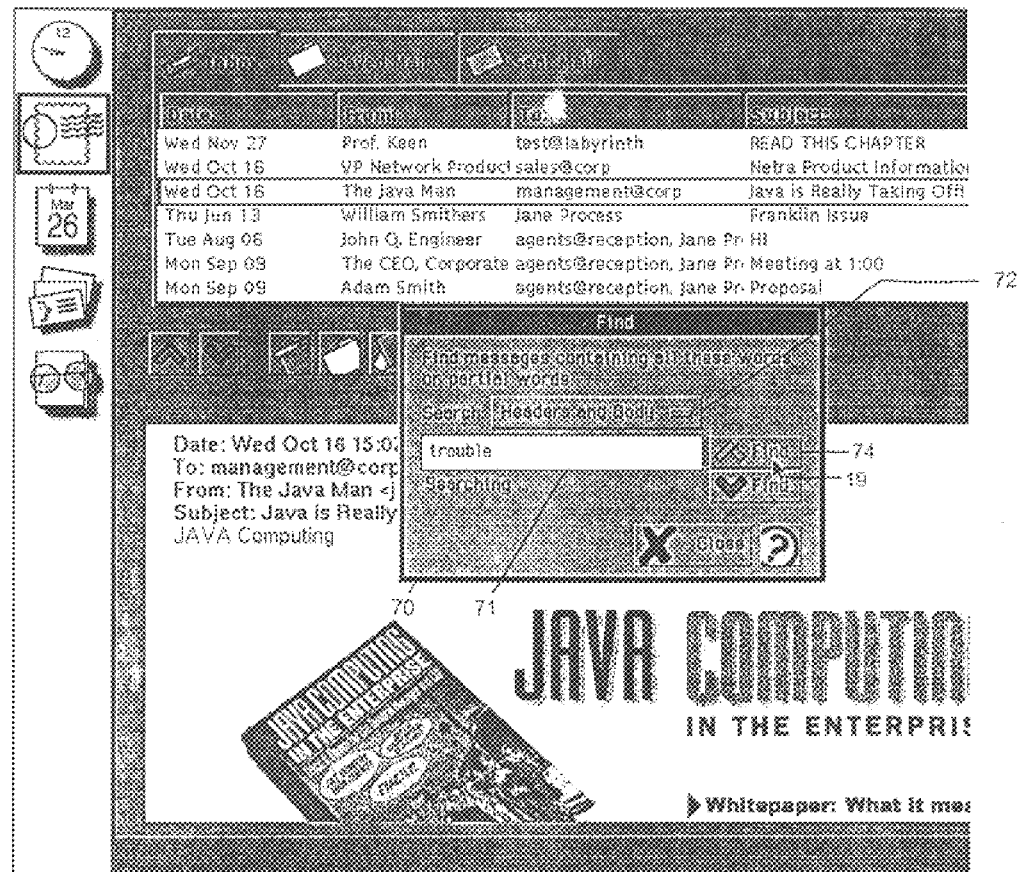

By clicking on the switch 17 on mouse 11 while cursor 19 is positioned over static "Find" button 73, the user causes the search process to be executed. FIG. 6b illustrates the same MailView screen as in FIG. 6a after static "Find" button 73 has been clicked. Note that the appearance of the "Find" button has changed to an animated "Find" button 74. The appearance of the animated "Find" button includes an animated clock hand which appears to the user to be rotating 360 degrees at a predetermined interval. The clock hand is superimposed on a background which constitutes a lightened version of the static "Find" button 73 appearance.

While not shown in FIG. 6b, the animated "Find" button 74 could further include a "Stop" label in place of the "Find" label to indicate to the user that the search may be stopped by the user simply by clicking on animated "Find" button 74 while the animation (and therefore the search) is running.

The invention therefore allows the user directly to associate the progress indicator directly with the command it is indicating because the progress indicator is located within or in close proximity to the command button graphic. Moreover, using this invention, the user has a strong sense that he or she has the ability to continue working with other functions within the application even while the progress indicator is running. The invention does not alter or remove the cursor, the user's primary interface, nor does it generate a dialog window blocking the other buttons on the display. Finally, some embodiments of the invention offer the user a direct way to stop the operation in-progress by clicking on the command button/progress indicator and communicate that option to the user through the button graphic itself.

Those with skill in the art will appreciate that numerous forms of dynamic in-button progress indicators other than "flashing" or an animated "spinning clock" may be used in accordance with the invention. For instance, a "spinning beach ball", "hour glass" or other animations could be implemented in place of the specific embodiments disclosed herein. Similarly, the "Stop" label 59 could be represented in various ways in order to communicate to the user the fact that the user may click on the button graphic to stop the operation in mid-progress.

Additionally, those skilled in the art will recognize that the invention may be implemented in either a stand-alone hardware environment, or distributed through network interface component 35 in a network environment.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims and their equivalents.

We claim:

1. A method for indicating on a computer display the progress of a computer-executable operation, the method comprising the steps of:

(a) establishing at a location of the display an icon that is associated with a computer executable operation, the icon having a first-state appearance that includes a graphical representation of the computer-executable operation;

(b) signaling the computer to execute the operation when a user clicks on the icon;

(c) altering the icon from its first-state appearance to a dynamic second-state appearance while the computer is executing the operation, the second-state appearance including an animated graphic superimposed on a version of the icon's first-state appearance; and (d) restoring the icon to its first state appearance when the computer has completed execution of the operation.

2. The method of claim 1 wherein the animated graphic is a clock.

3. A method for indicating on a computer display the progress of a computer-executable operation, the method comprising the steps of:

(a) establishing at a location of the display an icon that is associated with a computer executable operation, the icon having a first-state appearance that is a graphical representation of the computer-executable operation;

(b) signaling the computer to execute the operation when a user clicks on the icon;

(c) altering the icon from its first-state appearance to a dynamic second-state appearance while the computer is executing the operation, the second-state appearance including features indicating to the user that execution of the operation can be stopped by clicking on the icon; and (d) restoring the icon to its first state appearance when the computer has completed execution of the operation.

4. The method of claim 3 wherein the icon's second-state appearance has visual features that allow the user to associate the second-state appearance with the first-state appearance.

5. The method of claim 3 wherein step (c) comprises periodically adding then removing a highlight color from the icon's first-state appearance.

6. The method of claim 3 wherein the icon's second-state appearance includes an animated graphic.

7. The method of claim 3 further comprising the step (c1) of signaling the computer to stop execution of the operation when the user clicks on the icon's second-state appearance.

* * * * *